United States Patent [19]

Bauer et al.

[11] Patent Number: 4,467,402
[45] Date of Patent: Aug. 21, 1984

[54] VEHICLE LOCK ILLUMINATING SYSTEM

[75] Inventors: Karlheinz Bauer, Böblingen; Andreas Langenbeck, Sindelfingen; Peter Pfeiffer, Böblingen; Johann Tomforde, Sindelfingen, all of Fed. Rep. of Germany

[73] Assignee: Daimler-Benz AG, Stuttgart, Fed. Rep. of Germany

[21] Appl. No.: 259,904

[22] Filed: May 4, 1981

[30] Foreign Application Priority Data

May 3, 1980 [DE] Fed. Rep. of Germany ....... 3017096

[51] Int. Cl.³ .............................................. F21V 7/04
[52] U.S. Cl. ...................... 362/32; 362/80; 362/100; 362/295; 362/427; 362/802
[58] Field of Search .................. 362/80, 32, 100, 802, 362/66, 285, 365, 427, 295

[56] References Cited

U.S. PATENT DOCUMENTS

| 1,841,570 | 1/1932 | Burkholder | 362/100 |
| 2,304,690 | 12/1942 | Herder | 362/100 X |
| 2,438,847 | 3/1948 | Dreese | 362/100 |
| 2,661,417 | 12/1953 | Blackburn et al. | 362/100 X |
| 2,813,195 | 11/1957 | Willey et al. | 362/100 |
| 4,036,060 | 7/1977 | Deficis | 362/32 X |
| 4,041,301 | 8/1977 | Pelchat | 362/100 |
| 4,234,909 | 11/1980 | Cotroneo | 362/29 X |

FOREIGN PATENT DOCUMENTS

| 851604 | 10/1952 | Fed. Rep. of Germany | 362/100 |
| 2075170 | 11/1981 | United Kingdom | 362/80 |

Primary Examiner—Donald G. Kelly
Assistant Examiner—John S. Maples
Attorney, Agent, or Firm—Craig & Burns

[57] ABSTRACT

A door lock illuminating system disposed in a handle of a door, and, in particular, a door of a motor vehicle. The illuminating system being switchable by circuit elements connected to the handle, the handle is constructed as a unilaterally pivotable pull handle and a light emitting arrangement is disposed in such a fashion so as to be exposed only when the pull handle is pulled to an operative position. Electrical contacts are disposed in such a manner that with the pull handle being pulled to the operative position the electrical circuit of the illuminating system is completed.

19 Claims, 4 Drawing Figures

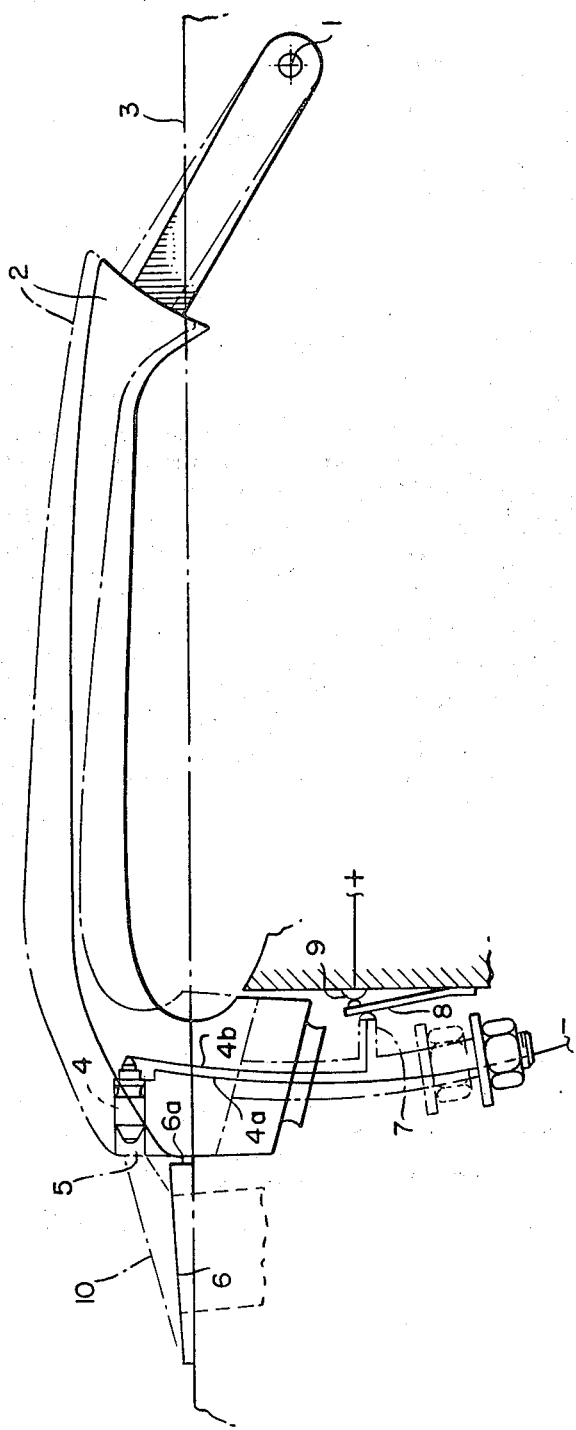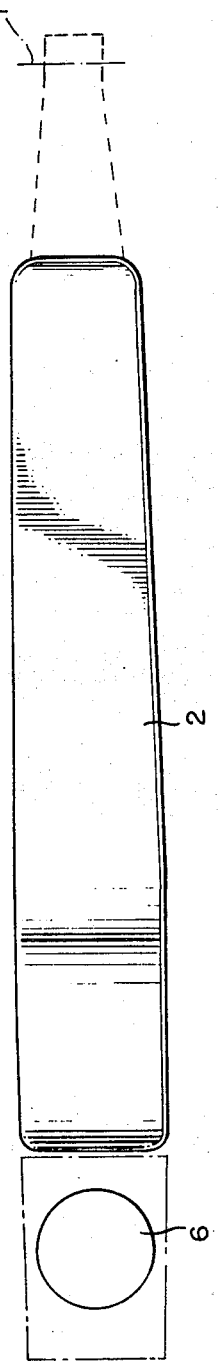

VEHICLE LOCK ILLUMINATING SYSTEM

The present invention relates to a lock illuminating system and, more particularly, to a door lock illuminating system adapted to be disposed in the handle of a motor vehicle door with the lighting system being switchable by circuit elements connected to the handle of the door.

A door lock illuminator is proposed in, for example, German Gebrauchsmusterschrift No. 1818326; however, the proposed illuminator is hardly practical in a door of a motor vehicle since in the proposed arrangement a separate push-button switch is disposed within the door handle. The separate push-button switch would require, in case of an application to a motor vehicle, to be shaped and sealed in such a fashion so as to guarantee proper operation of the switch over prolonged periods of operation of the vehicle along, for example, dirty or dust roads. Moreover, such a switch with the push-buttom being exposed to the elements of the weather would be expensive to manufacture in addition to be susceptible to fouling, changes in humidity, etc.

A further disadvantage of the above-noted proposed door lock illuminator resides in the fact that the light emitting surface thereof would be subjected to heavy fouling or dirting during such operation so that, from a practical point of view, the operability of the proposed device would have to be expected to become somewhat impaired over a relatively short period of time.

The aim underlying the present invention essentially resides in providing a door lock illuminator which is constructed so as to ensure a full operational ability over relatively long periods of time when the illuminator is used on a door of a motor vehicle.

In accordance with advantageous features of the present invention, a door of, for example, a motor vehicle is constructed so as to include a unilaterally pivotable pull handle, with a light emitting opening being disposed in such a fashion so as to be exposed only when the pull handle is operated or pulled out and with the electrical contacts being disposed in such a manner that, with the pull handle in a pulled out position the electrical circuit of the illuminating system is then completed.

By virtue of the above-noted feature of the present invention, it is possible to dispose the circuit elements in an interior of the door so that during driving operations of the motor vehicle the circuit elements as well as the light emitting surface would readily be protected from dirt and exposure to the elements.

Advantageously, in accordance with the present invention, a light source may be fixedly disposed in a vehicle in a protected manner with the light then being directed to a light emitting opening by light conducting cable.

It is also possible in accordance with the present invention to provide a bore in the pull handle, with a ring-shaped rod of transparent material being disposed in the bore whereby light may be directed from a vehicle protected light source to the light emitting opening.

Advantageously, an elastic seal may be provided and fastened to a solid part of the door in such a manner so as to protect the light emitting opening of the lock illuminator from a fouling or dirtying during normal vehicle operation, with the seal also acting as a scrapper for scrapping the dirt or the like from a cover of the light emitting opening.

Accordingly, it is an object of the present invention to provide a door lock illuminating system which avoids, by simple means, shortcomings and disadvantages encountered in the prior art.

Another object of the present invention resides in providing a door lock illuminating system adapted to be disposed in the handle of a door of a motor vehichle which is simple in construction an therefore relatively inexpensive to manufacture.

Yet another object of the present invention resides in providing a door lock illuminating system adapted to be disposed in a handle of a motor vehicle door which minimizes exposure of the light source and circuit elements from being exposed to the elements as well as minimizing suscepibility of the system to fouling or dirtying during normal operation of the motor vehicle.

A further object of the present invention resides in providing a door lock illuminating system adapted to be disposed in a handle of a motor vehicle door which is simple in construction and therefore relatively inexpensive to manufacture.

These and other objects, features, and advantages of the present invention will become more apparent from the following description when taken in connection with the accompanying drawings which show, for the purposes of illustration only, one embodiment in accordance with the present invention, and wherein:

FIG. 1 is a lateral partially schematic view of a door of a motor vehicle equipped with a lock illuminating system in accordance with the present invention;

FIG. 2 is a top view of the door handle of FIG. 1;

Figure 3:
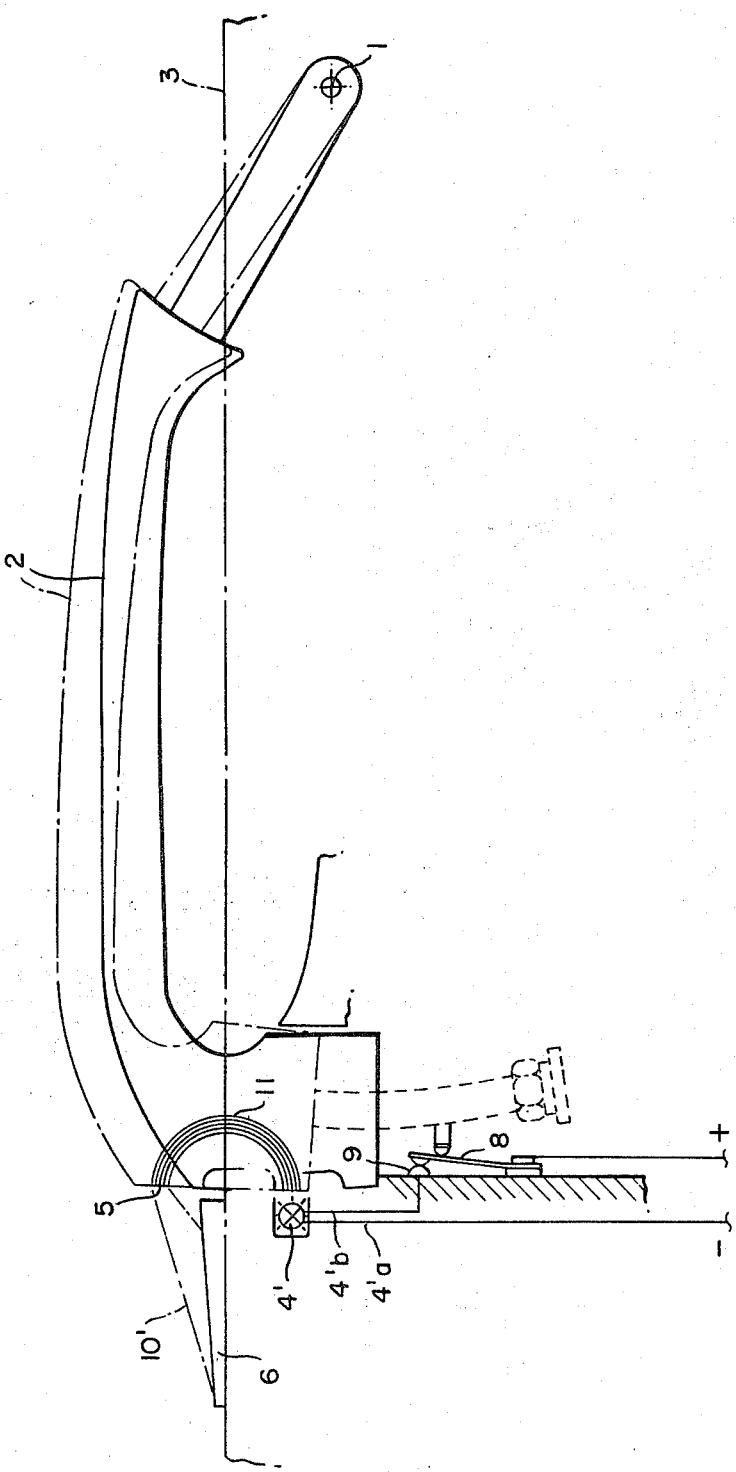
FIG. 3 is a lateral partially schematic view, similar to FIG. 1, of another embodiment of the invention showing a lock illuminating system having a light conducting cable.
Figure 4:
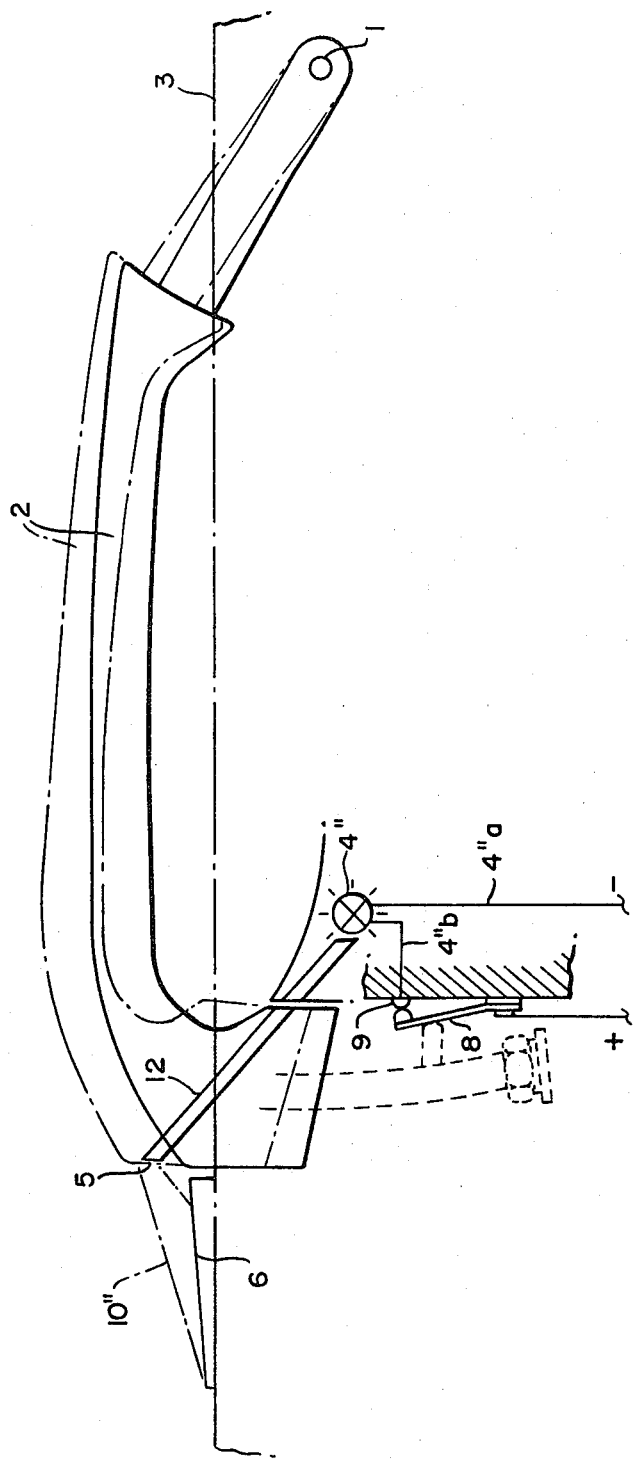
FIG. 4 is a lateral partially schematic view, similar to FIG. 1, of yet another embodiment of the invention showing a lock illuminating system having a transparent light transmitting rod.

Referring now to the drawings wherein like reference numerals are used in the various views to designate like parts and, according to these Figures, a schematically illustrated door 3 of a motor vehicle has mounted therein, in a conventional manner, a door handle 2 which is adapted to be pivoted about a pivot axis 1. The door handle cooperates with a conventional door locking arrangement in a manner not illustrated in detail in the drawing. As shown in FIGS. 1, 3 and 4 the door 2 handle is adapted to be pulled from a normal position illustrated in solid line into an opertive position illustrated in phantom line during an opening of the vehicle door 3.

In FIG. 1, a light source such as, for example, a light bulb 4 is arranged in a light emitting opening within the door handle 2 in an area of a lock cylinder 6 of the locking arrangement, with a light emitting surface 5 such as, for example, a lens or cover, being associated with the light bulb 4 and being disposed at the end of the opening accommodating the light bulb 4. When the door handle 2 is pulled outwardly from the solid line position to phantom line position of FIG. 1, light rays or beams 10 from the light bulb 4 are projected onto a surface of the lock cylinder 6 so as to illuminate the same.

As shown most clearly in FIG. 1, the lock cylinder 6 has a lateral surface 6a which projects above or upwardly from an outer surface or panel of the vehicle door 3 to such an extent that the lateral surface 6a covers the light emitting surface 5 when the door handle 2 is in the normal position illustrated in solid line thereby protecting the light emitting source from becomming soiled or otherwise damaged.

As shown in FIG. 1, suitable electric leads 4a, 4b extend from the light bulb 4 to a suitable electric source (not shown), with the electric lead 4b terminating at a protruding electrical contact 7 cooperable with a contact spring 8.

When the door handle 2 is pulled outwardly to the operative position, the circuit of the door lock illuminating system is completed by the protruding contact pressing or urging the contact spring 8 into engagement or abutment with a fixed contact 9.

An elastic seal (not shown) may be fastened to a portion of the vehicle door 3 in an area of the lateral surface 6a of the lock cylinder 6 or secured to the lateral surface 6a so as to protect the light emitting surface 5 and/or light emitting opening from becomming fouled during normal operation of the vehicle. Moreover, depending upon the elasticity and/or disposition, the seal may also function as a scrapper for scrapping or cleaning the light emitting surface 5 during a pivoting of the door handle 2 from the normal into the inoperative position and vice versa.

As seen in FIGS. 3 and 4, is also possible for the light source 4′, 4″, respectively, to be fixedly arranged, for example, within the vehicle door 3, with light rays 10′, 10″ being directed from the light source to the light emitting surface 5 by, for example, light conducting cables or rods 11, 12. A bore (not shown) may be provided in the door handle 2 for accommodating a ring-shaped rod 12 of transparent material, whereby light from a light source, 4″ fixed to the vehicle may be directed to the light emitting opening and/or light emitting surface 5. To actuate the light source 4′, 4″, of the embodiments shown in FIGS. 3 and 4, the contact spring 8 is shifted by the door handle 2 when it is pulled to the operative position to thereby abut fixed contact 9 and thereby complete the circuit for the illuminating system.

While we have shown and described only one embodiment in accordance with the present invention, it is understood that the same is not limited thereto but is susceptible of numerous changes and modifications as are known to one having ordinary skill in the art and we therefore do not wish to be limited to the details shown and described herein, but intend to cover all such modifications as are encompassed by the scope of the appended claims.

We claim:

1. An illuminating system, for illuminating a door lock of a motor vehicle, associated with a door handle of a motor vehicle door that is mounted on the motor vehicle door so as to be pivotable outwardly therefrom between a normal position and an operative position spaced outwardly from said normal position, comprising, light emitting means arranged in the door handle for emitting beams of light on the door lock, the light emitting means disposed in the door handle and exposed only when the door handle is pivoted outwardly to the operative position, and electrical contact means associated with an electric circuit for controlling the light emitting means connected to the light emitting means and the door handle in a manner wherein upon pulling of the door handle to the operative position the electric circuit of the illuminating system is completed and the light emitting means illuminates the door lock.

2. An illuminating system according to claim 1, characterized in that the light emitting means includes a light source mounted inside the door handle.

3. An illuminating system according to one of claims 1 or 2, characterized in that the electrical contact means includes a first contact mounted on the door handle for pivotal movement therewith, a fixed contact mounted on a fixed portion of the vehicle, and a contact spring interposed between the first contact and fixed contact, the contact spring adapted to be urged by the first contact into engagement with the fixed contact during a pivoting of the door handle.

4. An illuminating system according to claim 1, characterized in that the light emitting means includes a light emitting opening provided in the door handle, a light source means disposed within the vehicle, and means for directing light rays from the light source means to the light emitting opening.

5. An illuminating system according to claim 4, characterized in that the directing means is a light conducting rod.

6. An illuminating system according to claim 1, characterized in that a bore is provided in the door handle, the light emitting means includes a light emitting opening provided in the door handle, a light source means fixedly disposed within the vehicle, and an annular rod of transparent material accommodated in the bore for directing light from the light source means to the light emitting opening.

7. An illuminating system according to one of claims 1, 2, 4, 5, or 6, characterized in that means are provided on the vehicle door for scrapping the light emitting means during a pivoting of the door handle so as to clean the light emitting means.

8. An illuminating system according to one of claims 1, 2, 4, 5, or 6, characterized in that means are provided on the vehicle door for protecting the light emitting means from soiling during a normal driving of the vehicle.

9. An illuminating system according to claim 8, characterized in that the protecting means is an elastic seal fastened to a portion of the vehicle door.

10. An illuminating system according to claim 8, characterized in that the protecting means is a lateral surface of a lock cylinder of the door lock, the lateral surface having a height sufficient to cover the light emitting means when the door handle is in the normal position.

11. An illuminating system for door locks of motor vehicles, comprising light emitting means disposed in a shiftable portion of a door handle assembly for a vehicle door for illuminating an exposed portion of a lock assembly associated with said door, said shiftable portion of the door handle assembly manually pullable to shift said door handle assembly between a first position and a second position, means for protecting said light emitting means when said door handle assembly is in one of said first position and said second position, electrical contact means for controlling the emission of light from said light emitting means, wherein when said door handle assembly is manually shifted from said one of said first position and said second position said light emitting means is exposed and said contact means completes an electric circuit thereby causing the light emitting means to illuminate the exposed portion of said lock assembly.

12. An illuminating system according to claim 11, characterized in that the light emitting means includes a light source mounted inside the door handle.

13. An illuminating system according to claim 11, characterized in that the light emitting means includes a light emitting opening provided in the door handle, a light source means disposed within the vehicle, and means for directing light rays from the light source means to the light emitting opening.

14. An illuminating system according to claim 13, characterized in that the directing means is a light conducting rod.

15. An illuminating system according to claim 11, characterized in that a bore is provided in the door handle, the light emitting means includes a light emitting opening provided in the door handle, a light source means fixedly disposed within the vehicle, and an annular rod of transparent material accommodated in the bore for directing light from the light source means to the light emitting opening.

16. An illuminating system according to claim 11, characterized in that the protecting means is an elastic seal fastened to a portion of the vehicle door.

17. An illuminating system according to claim 11, characterized in that the protecting means is a lateral surface of a lock cylinder of the door lock, the lateral surface having a height sufficient to cover the light emitting means when the door handle is in the normal position.

18. An illuminating system according to claim 11, characterized in that said protecting means includes means on the vehicle door for scrapping the light emitting means during a pivoting of the door handle so as to clean the light emitting means.

19. An illuminating system according to claim 11, characterized in that the electrical contact means includes a first contact mounted on the door handle for pivotal movement therewith, a fixed contact mounted on a fixed portion of the vehicle, and a contact spring interposed between the first contact and fixed contact, the contact spring adapted to be urged by the first contact into engagement with the fixed contact during a pivoting of the door handle.

* * * * *